Figure 1:
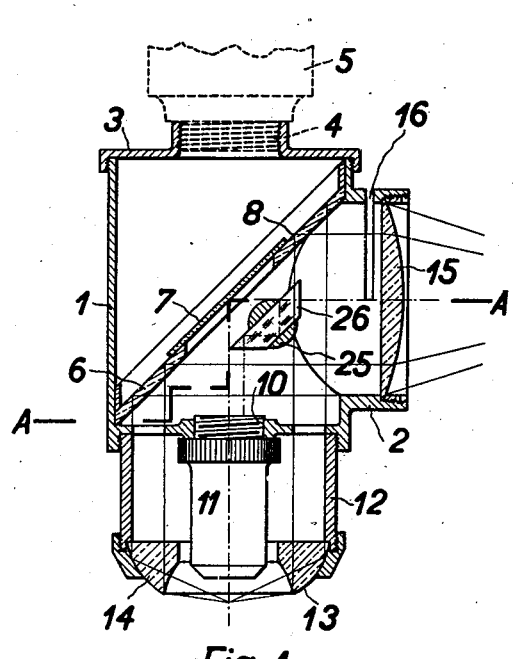

Jan. 16, 1934.  W. BAUERSFELD  1,943,509
APPARATUS FOR ILLUMINATING MICROSCOPIC OBJECTS
Filed Sept. 26, 1932

Inventor:
Walther Bauersfeld

Patented Jan. 16, 1934

1,943,509

UNITED STATES PATENT OFFICE 1,943,509

APPARATUS FOR ILLUMINATING MICROSCOPIC OBJECTS

Walther Bauersfeld, Jena, Germany, assignor to firm Carl Zeiss, Jena, Germany

Application September 26, 1932, Serial No. 634,944, and in Germany September 28, 1931

3 Claims. (Cl. 88—40)

I have filed an application in Germany, September 28, 1931.

In light-field illumination of microscopic objects with incident light use has frequently been made of a reflecting device disposed in the microscope tube, above the microscope objective, and so deviating a pencil of light rays emitted by a lateral light source that these rays, which traverse the objective and strike the object to be examined, have a direction reverse to that of the imaging rays, the reflecting device having either a plano-parallel glass plate according to Beck or a reflecting prism according to Nachet. The dark-field illumination of microscopic objects with incident light has been effected in a similar manner by means of a glass plate with a reflecting layer, this glass plate being construced as a ring and provided with a converging system which surrounds the microscope objective in a ring-like manner.

When microscoping with incident light, it is often desired to apply alernatively and in rapid succession the light-field and the dark-field illumination or to use these two kinds of illumination simultaneously. This object is arrived at by the invention. The invention is based on the idea to dispose in the microscope tube next to each other both a reflecting system for light-field illumination and a reflecting system for dark-field illumination and to effect a change from the one kind of illumination to the other by supplying light alternatively to the one and to the other reflecting system or, if so required, to use both systems simultaneously. This idea is realized by providing the illumination apparatus with a plate partially reflecting the light as well as with a plane annular reflector supplemented by a converging system and by rigidly interconnecting the plate and the annular reflector and disposing in front of these two parts a device for restricting the pencil of incident rays to different cross sections. Accordingly, the reflecting system may be for instance a plano-parallel glass plate having an annular reflecting layer, or a plano-parallel glass ring which has a reflecting layer and whose annular aperture is closed by an adherent plano-parallel glass plate. To restrict the cross section of the pencil of illumination rays, use may be made of suitable lenses and diaphragms disposed in the path of the illumination rays, outside the microscope tube.

The illumination apparatus may be further improved by disposing in front of the reflecting system consisting of plate and annular reflector a device for placing a reflecting prism according to Nachet into the path of illumination rays, which means that in light-field illumination the advantages of the two known methods may be utilized at will.

Figure 2:
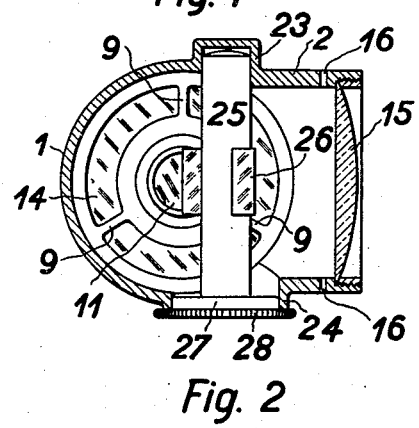
Figure 3:
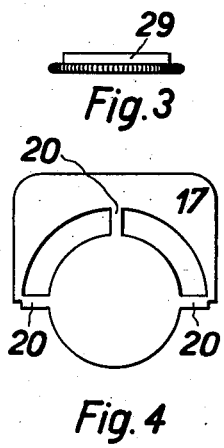
Figure 4:
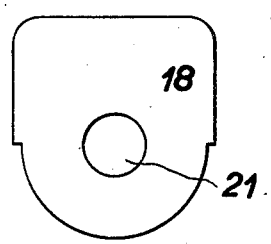
Figure 5:
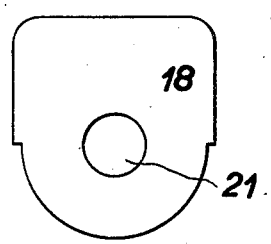
Figure 6:
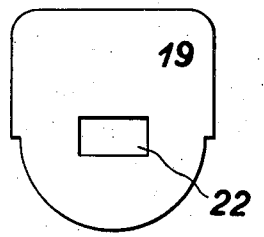

The accompanying drawing illustrates a constructional example of the illumination apparatus according to the invention. Figure 1 represents the apparatus in a central section in elevation. Figure 2 shows in a plan view a section through line A—A in Figure 1. Figure 3 represents a single part of the apparatus in a plan view, and Figures 4 to 6 show other single parts of the apparatus in side elevations.

The apparatus (Figures 1 and 2) has a cylindrical housing 1 which is provided with a lateral light entrance tube 2. The housing 1, which is to be fixed by means of a cover 3 to the thread 4 of a microscope tube 5, contains a reflecting system inclined at 45° relatively to the tube axis. This reflecting system consists of a plano-parallel glass ring 6 and a plano-parallel glass plate 7 so cemented to the ring 6 that it covers the annular aperture of this ring. That surface of the ring 6 which does not face the tube 2 is provided with a reflecting layer 8. In the lower end of the housing 1, three supports 9 hold a thread 10 into which is screwed a microscope objective 11. To the housing 1 is screwed a tube 12 surrounding the objective 11 and holding an annular glass body 14 having a reflecting exterior surface 13. The exterior surface 13 has the form of a paraboloid of rotation whose focus lies in the object plane of the objective 11.

In the light entrance tube 2 is mounted a converging lens 15. Behind this converging lens 15 half of the tube 2 has a slot 16 holding a diaphragm 17, 18 or 19. The diaphragm 17 (Figure 4) has a plate for stopping down the passage of light through the central part of the tube 2. With the exception of three supports 20, which prevent any passage of light, the diaphragm 17 provides the passage of a ray pencil of annular cross section. The diaphragms 18 (Figure 5) and 19 (Figure 6) have a circular central aperture 21 and a quadrilateral aperture, respectively.

In the wall of the housing 1 are disposed two support parts 23, 24 of different inside diameters supporting a bolt 25 in which is fixed a trapeziform reflecting prism 26. To one end of the bolt 25 is fixed a piece 27 and a knurled disc 28. The diameter of the piece 27 and consequently the interior diameter of the support part 24 are longer than the longest side of the trapeziform prism 26. The device is completed by a lid 29 (Figure 3) fitting into the support part 24.

When in use, the illumination apparatus is to be supplemented by a source of light. Similarly to the usual vertical illuminators, this source of light supplies to the apparatus a pencil of light rays from one side. The lens 15 produces a pencil of parallel illumination rays which has a circular cross section. For light-field illumination, use may be made either of the glass plate 7 or of the prism 26. In the latter case the bolt 25 is to be inserted into its support parts 23, 24 and the disc 28 is to be rotated so as to adjust the bolt 25 in such a manner that the light entrance surface and the light exit surface of the prism 26 face the lens 15, and the microscope objective 11, respectively. Moreover, the diaphragm 19 is to be inserted into the slit 16, as a consequence of which all light rays outside the light entrance surface of the prism 26 are stopped down. After three reflections on the prism surfaces, the rays entering the prism 26 are directed to one half of the microscope objective 11 which converges them in the object plane. Those imaging rays which traverse that half of the microscope objective which is not struck by the illumination rays are used for the observation. If the glass plate 7 is to be used in the illumination, the bolt 25 is to be removed from the housing 1 and the aperture of the support 24 is closed by means of the lid 29. Moreover, the diaphragm 18 is to be substituted for the diaphragm 19, the diaphragm 18 directing a central light pencil of circular cross section to the surface of the plate 7. The illumination rays are partly reflected by this surface and directed to the entire aperture of the microscope objective 11. In this kind of illumination, the illuminating as well as the imaging rays consequently traverse the same objective cross sections.

To obtain a dark-field illumination, only the diaphragm 17 is to be substituted for the diaphragm 18. The diaphragm 17 stops down the central part of the illumination ray pencil emitted by the lens 15 and provides only an annular passage. The rays traversing this annular slot are deviated downwardly by the reflecting layer 8 of the annular reflector 6 and arrive in the glass body 14 which converges them in the object by means of a reflection on the surface 13. It follows that the light incidence on the object is effected within an aperture range which may not be taken into account for the imaging rays. As in all cases in which use is made of the new illumination apparatus, the observation is effected through the glass plate 7.

An illumination representing a mixture of light-field and dark-field illumination is arrived at by inserting no diaphragm into the slot 16, that is to say by using the entire ray pencil emitted by the lens 15, the illumination rays being directed to the object by the microscope objective 11, through the glass plate 7, as well as by the glass body 14, by way of the annular reflector 6.

I claim:

1. An apparatus for light-field and dark-field illumination of microscopic objects with incident light, comprising a partly reflecting plate, a plane annular reflector, a converging optical system adapted to surround a microscope objective and coacting with the annular reflector, the said plate and the annular reflector being rigidly interconnected, and interchangeable means disposed in front of the said plate and annular reflector, these means restricting the cross section of the pencil of light rays entering the apparatus to that of the pencil of light rays striking one of the plane reflectors.

2. An apparatus for light-field and dark-field illumination of microscopic objects with incident light, comprising a partly reflecting plate, a plane annular reflector, a converging optical system adapted to surround a microscope objective and coacting with the annular reflector, the said plate being cemented to the annular reflector so as to cover the aperture of this reflector, and interchangeable means disposed in front of the said plate and annular reflector, these means restricting the cross section of the pencil of light rays entering the apparatus to that of the pencil of light rays striking one of the plane reflectors.

3. In an apparatus according to claim 1, a reflecting prism displaceably mounted in front of the said plate and annular reflector.

WALTHER BAUERSFELD.